United States Patent
Yamaguchi

(10) Patent No.: US 11,282,683 B2
(45) Date of Patent: Mar. 22, 2022

(54) IMAGING MASS SPECTROMETRIC DATA ANALYZER

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/959,451

(22) PCT Filed: Feb. 5, 2018

(86) PCT No.: PCT/JP2018/003759
§ 371 (c)(1),
(2) Date: Jul. 1, 2020

(87) PCT Pub. No.: WO2019/150575
PCT Pub. Date: Aug. 8, 2019

(65) Prior Publication Data
US 2021/0020420 A1    Jan. 21, 2021

(51) Int. Cl.
*H01J 49/00* (2006.01)
(52) U.S. Cl.
CPC ...... *H01J 49/0004* (2013.01); *H01J 49/0036* (2013.01)
(58) Field of Classification Search
CPC .......... H01J 49/0004; H01J 49/0036; H01J 49/0031; G01N 27/62; G01N 21/65
USPC .................................................. 250/281, 282
See application file for complete search history.

(56) References Cited

U.S. PATENT DOCUMENTS 8,384,021 B2 * 2/2013 Komatsu ............... G16B 45/00
250/282
2018/0197726 A1 * 7/2018 Yamaguchi .......... G06K 9/4652

FOREIGN PATENT DOCUMENTS

JP    2016153798 A    8/2016
WO    2015181893 A1   12/2015
WO    2017002226 A1    1/2017

OTHER PUBLICATIONS

Written Opinion in International Application No. PCT/JP2018/003759, dated Apr. 24, 2018.
(Continued)

*Primary Examiner* — Michael Maskell
(74) *Attorney, Agent, or Firm* — Sughrue Mion, PLLC

(57) ABSTRACT

A reference image data input section reads, from a Raman spectroscopic analyzer, a set of data constituting a Raman spectroscopic imaging graphic for a target sample. An ROI specification processor) displays a Raman spectroscopic imaging graphic based on those data on a display unit. An operator viewing the image operates an input unit to set a plurality of ROIs. Then, the ROI specification processor determines position information of the ROIs. An analysis processor extracts the data of measurement points corresponding to the set ROIs from MS imaging data acquired by an analysis performed by an imaging mass spectrometry unit for the same target sample. The processor also calculates an average mass spectrum from the data of a large number of measurement points for each ROI, and performs a multivariate analysis on the plurality of average mass spectrum data to compare the ROIs with each other or divide them into groups.

5 Claims, 2 Drawing Sheets

(56) References Cited

OTHER PUBLICATIONS

"iMScope TRIO Imeejingu Shitsuryou Kenbikyou (iMScope TRIO imaging mass microscope)", [online], [accessed on Nov. 6, 2017], Shimadzu Corporation, the Internet <URL: http://www.an.shimadzu.co.jp/bio/imscope/> (7 pages).
"Renishaw-sha Kenbi Raman Bunkoukoudokei (Renishaw Microscopic Raman Spectrophotometer)", [online], [accessed on Nov. 6, 2017], Shimadzu Corporation, the Internet <URL: http://www.an.shimadzu.co.jp/spectro/raman3.htm> (3 pages).
International Search Report in International Application No. PCT/JP2018/003759, dated Apr. 24, 2018.

\* cited by examiner

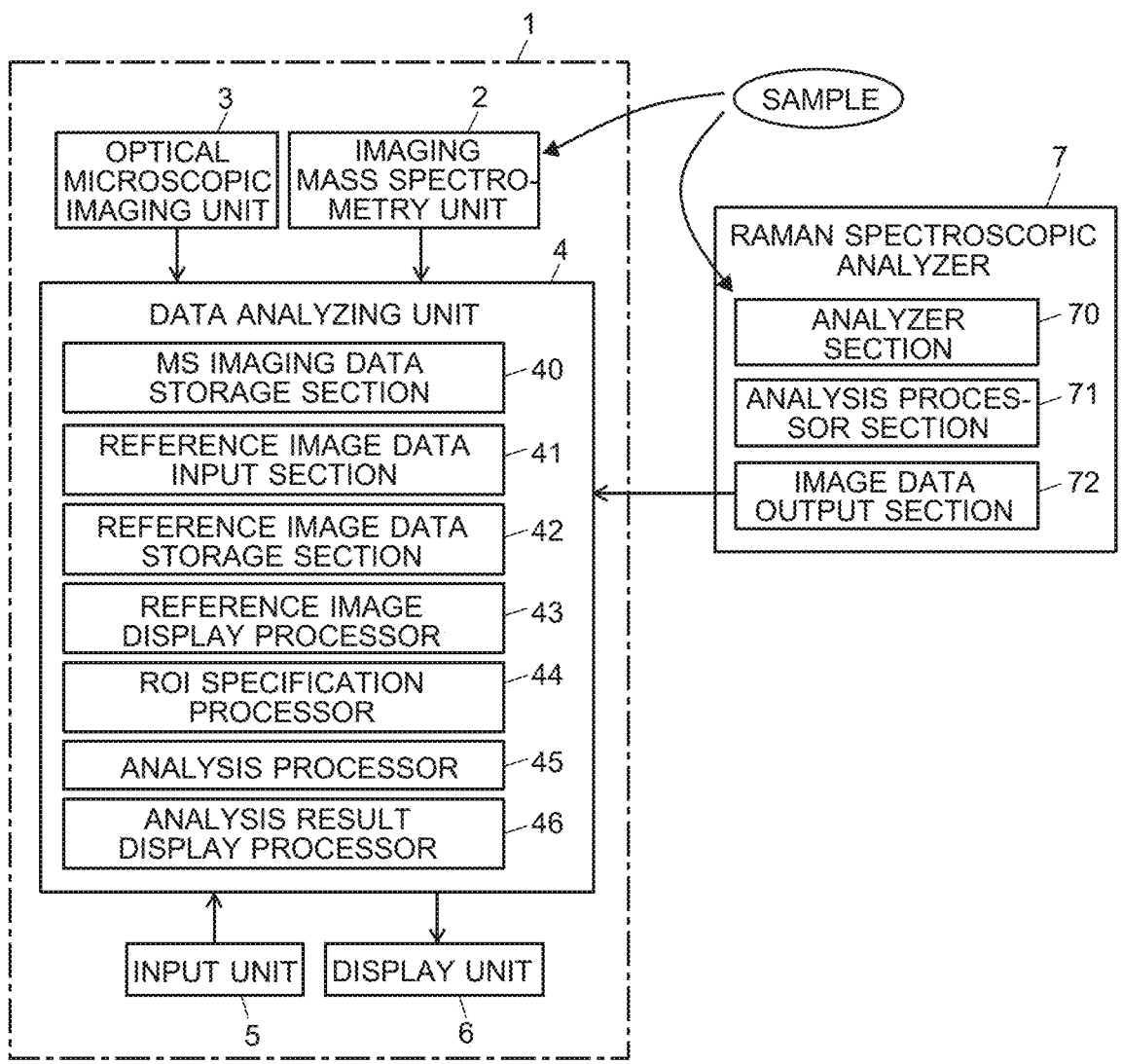

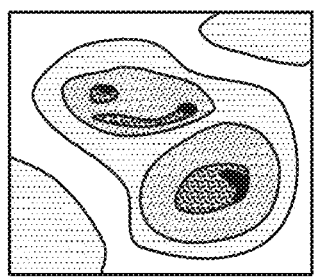
Fig. 2A
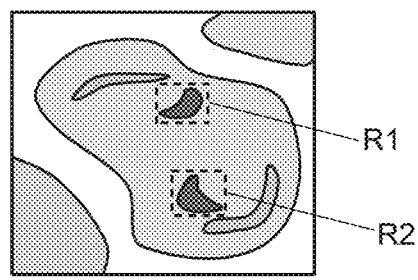
Fig. 2B
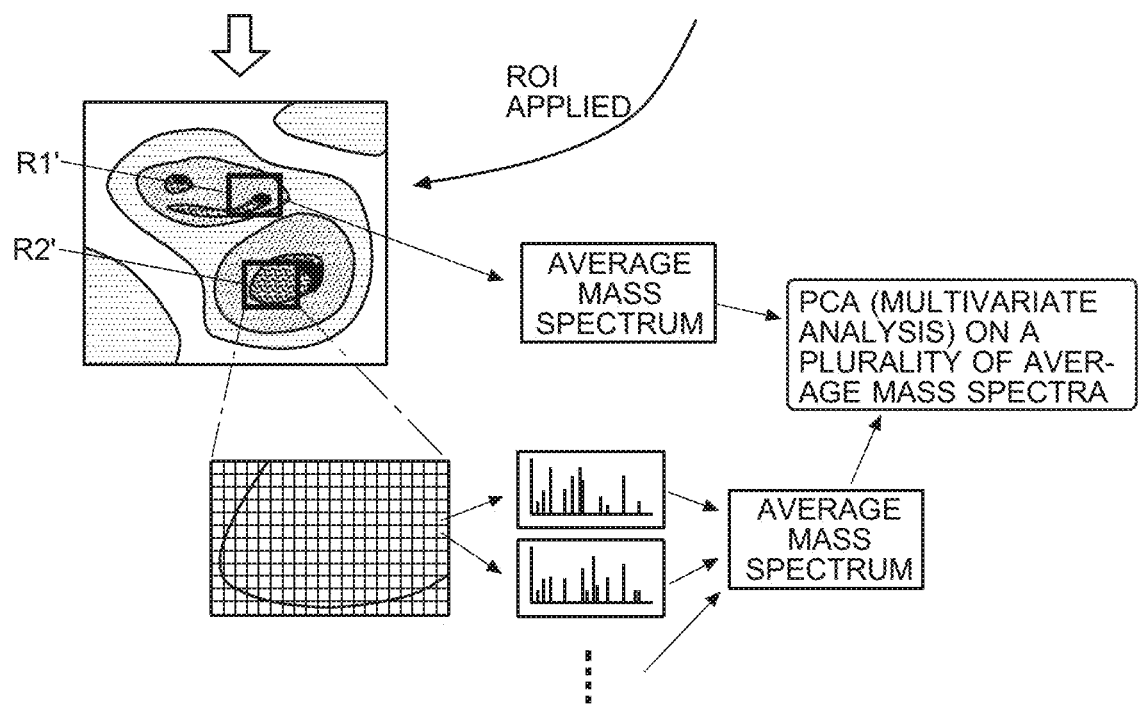

IMAGING MASS SPECTROMETRIC DATA ANALYZER

CROSS REFERENCE TO RELATED APPLICATIONS

This application is a National Stage of International Application No. PCT/JP2018/003759 filed Feb. 5, 2018.

TECHNICAL FIELD

The present invention relates to an imaging mass spectrometric data analyzer configured to analyze mass spectrum data collected with an imaging mass spectrometer at each micro area within a two-dimensional area on a sample.

BACKGROUND ART

An imaging mass spectrometer is a device which can measure the two-dimensional population distribution of an ion having a specific mass-to-charge ratio m/z on the surface of a sample, such as a biological tissue section, while allowing for a morphological observation of the same surface of the sample with an optical microscope (see Non Patent Literature 1 or other related documents). For example, imaging mass spectrometers can be used to obtain a mass spectrometric imaging graphic for an ion originating from a compound which is characteristically found with a specific kind of disease (e.g. cancer). Users can visually examine the graphic and recognize the extent of the spread or other features of the disease. Due to such functionality, in recent years, imaging mass spectrometers have been popularly used in such areas as a pharmacokinetic analysis on biological tissue sections or similar samples, an analysis of the variation in compound distribution depending on the kind of organ, or an analysis of the difference in compound distribution between a pathological site (e.g. cancer site) and a normal site.

Such an analysis normally requires a user to set one or more regions of interest (ROIs) on a mass spectrometric imaging graphic to conduct a comparative analysis, differential analysis or similar analysis between a plurality of ROIs or for the same ROI on different samples (see Patent Literature 1 or other related documents). However, it is often the case that the internal structure of a biological tissue cannot be clearly observed on a mass spectrometric imaging graphic. Therefore, an optical microscope image of a section of the sample may also be used in place of the mass spectrometric imaging graphic in order to properly set the ROI. An image in which an optical microscope image and a mass spectrometric imaging graphic are superposed on each other may also be used for the setting of the ROI.

CITATION LIST

Patent Literature

Patent Literature 1: WO 2015/181893 A1
Non Patent Literature 1: "iMScope TRIO Imeejingu Shitsuryou Kenbikyou (iMScope TRIO imaging mass microscope)", [online], [accessed on Nov. 6, 2017], Shimadzu Corporation, the Internet
Non Patent Literature 2: "Renishaw-sha Kenbi Raman Bunkoukoudokei (Renishaw Microscopic Raman Spectrophotometer)", [online], [accessed on Nov. 6, 2017], Shimadzu Corporation, the Internet

SUMMARY OF INVENTION

Technical Problem

An optical microscope image allows the user to visually examine the shape, color and other features of a biological tissue and make judgments for the setting of the ROI. Conversely, it is most likely that a site whose presence is visually unclear is not considered as an ROI and excluded from the candidates of ROI. Understandably, a site whose presence is visually unclear may be visible on a mass spectrometric imaging graphic. However, since a mass spectrometric imaging graphic is normally an image which use a color scale to represent ion intensities, the difference between two sites may not be recognized by a user if the difference in ion intensity between those sites is not sufficient for exhibiting a significant difference in display color. Furthermore, in the case where a specific mass-to-charge ratio for detecting the occurrence of a disease by a differential analysis or similar technique needs to be extracted as a marker, it is difficult to use a mass spectrometric imaging graphic or an image prepared by superposing a mass spectrometric imaging graphic and an optical microscope image. In such a case, the setting of an appropriate ROI requires an inefficient process of trial and error.

The present invention has been developed to solve such a problem. Its primary objective is to provide an imaging mass spectrometric data analyzer which allows a user to properly set a notable site as a region of interest and conduct an analysis even when the region of interest cannot be properly set by the visual examination of an optical microscope image, mass spectrometric imaging graphic or the like by the user.

Solution to Problem

The present invention developed for solving the previously described problem is an imaging mass spectrometric data analyzer including an input unit and a display unit as a user interface and being configured to process mass spectrometric data acquired from each of a plurality of micro areas within a two-dimensional area on a sample, the imaging mass spectrometric data analyzer including:

a) a reference image display processor configured to create an image showing a two-dimensional intensity distribution acquired by using an imaging analysis technique which does not include mass spectrometric imaging, for at least a partial range of a two-dimensional area for which mass spectrometric data previously acquired on one or more samples are available, and to display the image on a screen of the display unit;

b) an ROI specification processor configured to allow a user to specify, using the input unit, a plurality of regions of interest on a two-dimensional intensity distribution image displayed on the screen of the display unit, and to acquire position information corresponding to the plurality of specified regions of interest; and c) an analysis processor configured to extract mass spectrometric data at one or more micro areas in each of the plurality of regions of interest respectively corresponding to the plurality of regions of interest obtained by the ROI specification processor, and to perform a multivariate analyzing process using the extracted mass spectrometric data, based on the position information corresponding to the plurality of regions of interest.

The "mass spectrometric data" in the present invention includes mass spectrum data, $MS^n$ spectrum data with n being equal to or greater than two (it should be noted that the term "mass spectrum data" in the following description includes "MS" spectrum data"), signal intensity data at one or more specific mass-to-charge ratios, signal intensity data at one or more specific MRM (multiple reaction monitoring) transitions as well as other types of data.

In the present invention, the "imaging analysis technique which does not include mass spectrometric imaging" may be any one of the various methods, such as Raman spectroscopic imaging, fluorescent imaging, infrared spectroscopic imaging, or X-ray imaging.

As for the multivariate analyzing process performed by the analysis processor, an appropriate technique can be used according to the purpose of the analysis, such as the comparison of a plurality of ROIs or classification of the ROIs. For example, principal component analysis (KA), partial least squares discrimination analysis (PLS-DA), hierarchical cluster analysis (FICA) or K-means method may preferably be used.

In the present invention, the reference image display processor receives, e.g. from an external device, a set of data collected by one of the aforementioned kinds of imaging analysis techniques different from mass spectrometric imaging, i.e. a set of data showing a two-dimensional intensity distribution of a predetermined range, then creates a two-dimensional intensity distribution image based on the data, and displays it on the screen of the display unit. Under normal conditions, a two-dimensional intensity distribution image acquired for a sample by an analysis technique different from mass spectrometry is different from the mass spectrometric imaging graphic acquired for the same sample. Accordingly, the user specifies a plurality of ROIs on the two-dimensional intensity distribution image displayed on the screen of the display unit, using the input unit.

The specification of the ROIs can be performed, for example, by appropriately changing the size of a rectangular frame (or any appropriate shape of frame) displayed on the screen and changing the position of the frame to surround an ROI. The ROI specification processor acquires a piece of position information for each of the plurality of specified ROIs. Based on the pieces of position information acquired for the plurality of ROIs, the analysis processor subsequently identifies one or more micro areas which correspond to the ROIs and have been subjected to imaging mass spectrometry, and extracts mass spectrometric data at those micro areas. Then, the analysis processor performs a multivariate analyzing process using the extracted mass spectrometric data to extract, for example, a mass-to-charge ratio which occurs in a considerable number of ROIs among the plurality of ROIs.

In normal cases, each ROI has a plurality of corresponding micro areas. How the multivariate analyzing process should be applied to the mass spectrometric data acquired at each of those micro areas (typically, mass spectrum data over a predetermined range of mass-to-charge ratios) can be appropriately determined. For example, an average mass spectrum may be obtained for each ROI by averaging the signal intensities at each mass-to-charge ratio in the mass spectrum data acquired at the Micro areas corresponding to the ROI, and a principal component analysis may be performed on the average mass spectra of the plurality of ROIs. By such a technique, three or more ROIs can be classified into two groups of similar nature, and a mass-to-charge ratio contributing to the classification can be extracted.

Thus, if a characteristic site which is dissimilar to the other sites on a sample can be discriminated by an analyzing technique which is neither the imaging mass spectrometry nor simple optical microscopic observation, the result of the analysis can be used to extract information worth noting from the result of the imaging mass spectrometry and analyze the same information.

As with the device disclosed in Non Patent Literature 1, an imaging mass spectrometer is often equipped with an optical microscope having an imaging function. Accordingly, the reference image display processor in the present invention may be configured to display, on the screen of the display unit, an image in which an optical microscope image created based on optical microscope image data acquired along with the imaging mass spectrometric data and an image showing the two-dimensional intensity distribution acquired by using the imaging analysis technique are superposed on each other.

For example, even when the shape and contour of a target biological tissue on a biological sample is invisible or unclear, or the boundaries between different types of biological tissues are invisible or unclear on an image showing a two-dimensional intensity distribution acquired by using the imaging analysis technique, such a site will be visible on the image in Which the optical microscope image is superposed. This helps the user easily specify an ROI, thereby allowing the user to properly specify a target ROI.

Advantageous Effects of Invention

The imaging mass spectrometric data analyzer according to the present invention allows a user to properly set a notable site as a region of interest and conduct an analysis even when the region of interest cannot be properly set by the visual examination of an optical microscope image, mass spectrometric imaging graphic or the like by the user. Accordingly, a proper and accurate analysis based on the information obtained from an exactly set ROI can be efficiently performed.

BRIEF DESCRIPTION OF DRAWINGS

FIG. 1 is a schematic configuration diagram of one embodiment of an imaging mass spectrometry system including an imaging mass spectrometric data analyzer according to the present invention.

FIGS. 2A and 2B are diagrams illustrating the analyzing operation in the imaging mass spectrometry system according to the present embodiment.

DESCRIPTION OF EMBODIMENTS

One embodiment of an imaging mass spectrometry system including an imaging mass spectrometric data analyzer according to the present invention is hereinafter described with reference to the attached drawings.

FIG. 1 is a schematic configuration diagram of the imaging mass spectrometry system according to the present embodiment.

The imaging mass spectrometry system according to the present embodiment includes an imaging mass spectrometer 1 and a Raman spectroscopic analyzer 7 which is a device separate from the imaging mass spectrometer 1.

The imaging mass spectrometer 1 includes an imaging mass spectrometry unit 2 configured to perform a measurement on a sample, an optical microscopic imaging unit 3 configured to take an optical microscope image of a sample, a data analyzing unit 4, as well as an input unit 5 and a display unit 6 constituting the user interface. The Raman spectroscopic analyzer 7 includes an analyzer section 70 configured to perform a Raman spectroscopic analysis on a sample, an analysis processor section 71 configured to process the acquired data, and an image data output section 72 configured to output data which constitute a Raman spectroscopic image. As the Raman spectroscopic analyzer, for example, the device disclosed in Non Patent Literature 2 can be used.

In the imaging mass spectrometer 1, the imaging mass spectrometry unit 2 includes, for example, a matrix assisted laser desorption/ionization ion-trap time-of-flight mass spectrometer. It acquires mass spectrum data for each measurement point by performing a mass spectrometric analysis for each of a large number of measurement points (micro areas) within a two-dimensional measurement area on a sample, such as a biological tissue section.

The data analyzing unit 4 is configured to receive mass spectrum data collected at each measurement point by the imaging mass spectrometry unit 2 and Raman spectroscopic imaging graphic data sent from the Raman spectroscopic analyzer 7, as well as perform predetermined processing using those data. It includes an MS imaging data storage section 40, reference image data input section 41, reference image data storage section 42, reference image display processor 43, ROI specification processor 44, analysis processor 45, analysis result display processor 46 and other functional blocks.

In typical cases, the data processing unit 4 is actually a personal computer (or more sophisticated workstation), with the functions of the aforementioned blocks realized by executing, on the computer, dedicated software installed on the same computer. In that case, the input unit 5 is a keyboard and a pointing device, such as a mouse, while the display unit 6 is a display monitor.

In the Raman spectroscopic analyzer 7, an operator (user) sets a sample (e.g. mouse liver section) at a predetermined measurement position in the analyzer section 70 and performs a predetermined operation. Then, the analyzer section 70 performs a Raman spectroscopic imaging measurement for a predetermined measurement range on the sample. The analysis processor section 71 processes the acquired spectrum data to create a graphic image. In the imaging mass spectrometer 1, the operator subsequently performs a predetermined operation using the input unit 5. Then, the reference image data input section 41 reads image data outputted from the image data output section 72 in the Raman spectroscopic analyzer 7, and stores the data in the reference image data storage section 42.

Meanwhile, after the Raman spectroscopic analysis of the sample has been completed, the operator sets the same sample at a predetermined measurement position in the imaging mass spectrometry unit 2 of the imaging mass spectrometer 1, and performs a predetermined operation using the input unit 5. Then, the optical microscopic imaging unit 3 takes an image of the surface of the sample and displays the image on the screen of the display unit 6. On this image, the user specifies, from the input unit, a measurement area which may be either a portion or the entirety of the sample. The imaging mass spectrometry unit 2 performs a mass spectrometric analysis on each of the large number of measurement points within the measurement area, and acquires mass spectrum data over a predetermined range of mass-to-charge ratios. As a result, the same number of sets of mass spectrum data as the number of measurement points within the measurement area are obtained (those data are hereinafter called the "MS imaging data."). The sets of data are sent to the data analyzing unit 4 and stored in the MS imaging data storage section 40.

The operator subsequently performs a predetermined operation using the input unit 5. Then, the reference image display processor 43 reads image data from the reference image data storage section 42, creates a Raman spectroscopic imaging graphic for the sample based on the read data, and displays the graphic on the screen of the display unit 6. FIG. 2B shows one example of the Raman spectroscopic imaging graphic to be displayed. The ROI specification processor 44 displays a predetermined number of ROI-specifying area marks on the displayed image. In FIG. 2B, two ROI-specifying area marks R1 and R2 are displayed, each of which is a rectangular frame. The shape of those frames may be arbitrarily changed. The number of frames may also be any number which does not exceed a previously determined upper limit.

The operator visually checks the Raman spectroscopic imaging graphic and sets ROIs for a plurality of sites at which a multivariate analysis (which will be described later) should be performed. Specifically, the operator appropriately adjusts the size of the ROI-specifying area marks R1 and R2 by an operation of the input unit 5 as well as changes the position of the ROI-specifying area marks R1 and R2 so as to surround each target site. After the ROI-specifying area marks R1 and R2 have been set at the target sites, the operator performs a predetermined operation to fix the specification. After the specification has been fixed, the ROI specification processor 44 determines information indicating the positional coordinates within the entire image at which the ROI-specifying area marks R1 and R2 are located at that point in time. It is also possible to allow users to set an arbitrary form of ROI by repeating the clicking operation multiple times so as to surround a target site, instead of using the ROI-specifying area marks.

The analysis processor 45 receives the position information of the plurality of ROIs from the ROI specification processor 44 and reads, for each ROI, mass spectrum data at all measurement points corresponding to the ROI from the MS imaging data storage section 40. More specifically, as shown in FIG. 2A, the analysis processor 45 reads mass spectrum data acquired at each measurement point within the ROIs R1' and R2' on the mass spectrometric imaging graphic created based on the MS imaging data, and then calculates an average mass spectrum for each ROI by computing the average value of the signal intensity at each mass-to-charge ratio based on the plurality of sets of mass spectrum data. Accordingly, the same number of average mass spectra as the number of ROIs specified by the operator are obtained.

Subsequently, based on one average mass spectrum, the analysis processor 45 creates a one-dimensional table in which signal-intensity values are arranged in ascending order of mass-to-charge-ratio value within a predetermined range of mass-to-charge ratios (e.g. m/z 100.0, 100.1, 100.2, . . . ), and then creates a two-dimensional table by combining a plurality of one-dimensional tables each of which corresponds to one ROI. Then, the analysis processor 45 performs a principal component analysis (PCA), which is a technique for multivariate analysis, on those data included in the two-dimensional table to calculate a score plot and loading plot. Each point on the score plot corresponds to an ROI. Therefore, the score plot allows for the determination of the closeness or distance between the ROIs on the axes of the score plot, i.e. on the principal component axes. Dividing the ROIs into groups is also possible. On the other hand, each point on the loading plot corresponds to a mass-to-charge-ratio value. Therefore, for example, a mass-to-charge-ratio value contributing to the grouping of the ROIs, i.e. a marker, can be located from the loading plot.

In place of the principal component analysis, various techniques for multivariate analysis can be used, such as the partial least squares discrimination analysis (PLS-DA), hierarchical cluster analysis (HCA) or K-means method.

Thus, in the imaging mass spectrometry system according to the present embodiment, a plurality of ROIs can be specified on a Raman spectroscopic imaging graphic which shows an intensity distribution different from the mass spectrometric imaging graphic, and a multivariate analysis based on the mass spectrum data acquired for those ROIs can be performed. Therefore, an ROI can be set for a site which is indiscernible on the optical microscope image or mass spectrometric imaging graphic.

In the previous embodiment, a Raman spectrometric imaging graphic is used as a reference image for setting ROIs. An image or graphic acquired by any other technique for imaging analysis may be used as long as the image or graphic provides intensity distribution information different from an optical microscope image or mass spectrometric imaging graphic. Specifically, for example, an image acquired by various analyzing methods can be used, such as the fluorescent imaging, infrared spectroscopic imaging or X-ray imaging.

The setting of the ROIs does not always need to be directly performed on the image or graphic acquired by any of those various techniques for imaging analysis. For example, the task may be performed on an image in which a Raman spectroscopic imaging graphic and an optical microscope image are superposed on each other. Such a superposed image reflects not only the intensity distribution obtained by a Raman spectroscopic analysis but also the morphological observation image of the shape and other features of the biological tissue. Therefore, users can set ROIs more properly by referring to such a morphological observation image.

In the previous embodiment, a plurality of ROIs are set on an image obtained for one sample. It is also possible to prepare a plurality of images respectively obtained for a plurality of samples e.g. biological tissue sections) and set one or more ROIs on each of those images to perform a similar processing on the plurality of ROIs set for the plurality of images. In other words, there is no limitation on the number of samples or the number of ROIs that can be set on one sample. The minimum requirement is that a collection of data have been obtained for the same sample or the same set of samples by performing both an imaging mass spectrometric analysis and a type of analysis using a different technique of imaging analysis, such as a Raman spectroscopic analysis.

It should also be naturally understood that the previous embodiment is a mere example of the preset invention, and any change, modification or addition appropriately made within the spirit of the present invention in any aspect other than the various modifications described so far will also fall within the scope of claims of the present application.

REFERENCE SIGNS LIST

1 . . . Imaging Mass Spectrometer
2 . . . Imaging Mass Spectrometry Unit
3 . . . Optical Microscopic Imaging Unit
4 . . . Data Analyzing Unit
40 . . . Imaging Data Storage Section
41 . . . Reference Image Data Input Section
42 . . . Reference Image Data Storage Section
43 . . . Reference Image Display Processor
44 . . . ROI Specification Processor
45 . . . Analysis Processor
46 . . . Analysis Result Display Processor
5 . . . Input Unit
6 . . . Display Unit
7 . . . Raman Spectroscopic Analyzer
70 . . . Analyzer Section
71 . . . Analysis Processor Section
72 . . . Image Data Output Section

The invention claimed is:

1. An imaging mass spectrometric data analyzer including an input unit and a display unit as a user interface and being configured to process mass spectrometric data acquired from each of a plurality of micro areas within a two-dimensional area on a sample, the imaging mass spectrometric data analyzer comprising:
   a) a reference image display processor configured to create an image showing a two-dimensional intensity distribution acquired by using an imaging analysis technique which does not include mass spectrometric imaging, for at least a partial range of a two-dimensional area for which mass spectrometric data previously acquired on one or more samples are available, and to display the image on a screen of the display unit;
   b) an ROI specification processor configured to allow a user to specify, using the input unit, a plurality of regions of interest on a two-dimensional intensity distribution image displayed on the screen of the display unit, and to acquire position information corresponding to the plurality of specified regions of interest; and
   c) an analysis processor configured to extract mass spectrometric data at one or more micro areas in each of the plurality of regions of interest respectively corresponding to the plurality of regions of interest obtained by the ROI specification processor; to perform a multivariate analyzing process on a plurality of the extracted mass spectrometer data, each of which is extracted from one of the plurality of regions of interest; and to compare or classify the plurality of regions of interest, using the extracted mass spectrometric data, based on the position information corresponding to the plurality of regions of interest.

2. The imaging mass spectrometric data analyzer according to claim 1, wherein the imaging analysis technique is selected from Raman spectroscopic imaging, fluorescent imaging, infrared spectroscopic imaging and X-ray imaging.

3. The imaging mass spectrometric data analyzer according to claim 1, wherein the multivariate analyzing process is selected from a principal component analysis, partial least squares regression, hierarchical cluster analysis and K-means method.

4. The imaging mass spectrometric data analyzer according to claim 2, wherein the multivariate analyzing process is selected from a principal component analysis, partial least squares regression, hierarchical cluster analysis and K-means method.

5. The imaging mass spectrometric data analyzer according to claim 1, wherein the analysis processor is configured to calculate an average mass spectrum at each of the plurality of regions of interest, and to perform the multivariate analyzing process for the calculated average mass spectra.

* * * * *